Patented Feb. 13, 1945

2,369,307

UNITED STATES PATENT OFFICE 2,369,307

STABILIZED DIAZO COMPOUNDS

Paul P. McClellan, Old Greenwich, and Walter P. Ericks, Cos Cob, Conn., assignors to American Cyanamid Company, New York, N. Y., a corporation of Maine No Drawing. Application December 12, 1940, Serial No. 369,806

10 Claims. (Cl. 260—140)

This invention relates to a new class of chemical compounds, to intermediates and dyes obtained therefrom, and to their methods of preparation.

The principal object of this invention is to prepare new stabilized diazo compounds, preferably those soluble in water and in the more commonly used organic solvents.

Among the stabilized diazo compounds included herein are, more especially, the reaction products of an ice color diazo component with an alkylol or an alkoxyalkylol derivative of cyanamide, dicyandiamide, guanidine, guanylurea or biguanide. Inasmuch as these derivatives each exist in several tautomeric forms, the reaction products prepared from any one may occur as a mixture of isomers which readily undergo rearrangement. Hence, assignment of a definite chemical formula is problematical.

However, the chemical properties of the products and the particular method or methods of preparation disclosed herein cause one of the isomers to appear in excess, and under the present conditions the monomeric form is produced predominantly. Thus in the case of the alkylol and alkoxyalkylol cyanamide derivatives the stable water soluble condensation products have the probable formula:

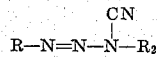

The guanidine derivatives probably have the formula:

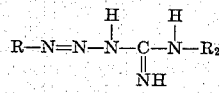

The guanylurea derivatives probably give:

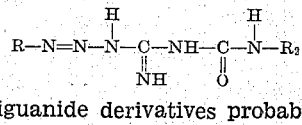

and the biguanide derivatives probably give:

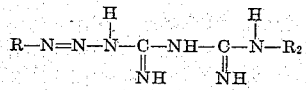

in each of which R represents the nucleus of an aromatic amine such as the nucleus of an ice color diazo component; and $R_2$ is an alkylol or alkoxyalkylol group.

These stabilized diazo compounds are resistant to percussion and even when heated in a direct flame decompose without the hazard of an explosion. When in a dry condition or in an alkaline solution they are stable at temperatures normally encountered throughout all seasons of the year, and hence may be stored indefinitely. However, these reaction products possess the property of splitting into their original components by treatment with acids at elevated temperatures or with steam containing volatile acid vapors. If this splitting occurs in the presence of an ice color coupling component the regenerated active diazotized component becomes available immediately for reaction with the coupling component and produces the corresponding azo pigment or dye.

To this end it is a further object of this invention to prepare new azo pigments and dyes by mixing an ice color coupling component and the reaction product of an ice color diazo component with an alkylol or alkoxyalkylol derivative of cyanamide, guanidine, guanylurea or biguanide. As such, the mixture may or may not be colored. However, if a textile material is printed or impregnated with this mixture and then heated in the presence of an acid, the acid hydrolyzes the stable diazo compound, splitting it into its components; and the regenerated diazotized component liberated couples with the ice color component to form an azo pigment or dye.

This acid treatment or ageing as it is called, is preferably effected with a weak acid and at an elevated temperature. Usually formic or acetic acids are used, but various other acids as well as substances liberating acids upon being steamed such as ammonium sulfate, esters of tartaric, succinic, etc., acids may be used particularly when the printed material is subjected to a subsequent steam treatment to effect ageing or develop the color.

Stable alkaline printing pastes can be prepared from the mixture of the ice color coupling component and the reaction product of the ice color diazo component with one of the alkylol or alkoxyalkylol derivatives by dissolving the mixture in a solvent such as water, alcohol, acetone, etc., together with various other ingredients such as alkalies, organic bases, impregnating agents, thickeners such as starch, gum, etc., well known to those skilled in the art. Cotton goods can be printed with this paste with the aid of a copper roll. The print is then dried and subsequently the desired color is developed by steaming in the presence of acetic acid or other volatile acid vapors. In this manner an insoluble azo pigment is produced in and on the cotton fibers in the form of the printed pattern. Such prints are bright and possess remarkable fastness to light and washing.

The facility with which the compounds and dyes included in this invention can be used is based upon the ease with which the stabilized diazamino group present can be split and converted into an active diazo group by heating in the presence of an acid or an acid liberating substance. This conversion or ageing is usually effected in a steam chamber and in the presence of a coupling component (e. g. naphthol in most of the examples given below) to develop or form the color.

The following examples describe the preparation of several stabilized diazo compounds included in this invention and further give details as to their use in dyeing and printing textile materials.

Example I

A stabilized diazo compound prepared from p-toluidine diazonium chloride and monoethylol cyanamide was obtained as follows:

An aqueous solution of monoethylol cyanamide was first prepared by slurrying 66.5 g. of cyanamid (60.2% NCNCa) in 250 cc. of water and stirring rapidly for about an hour. The agitated slurry was cooled to 5° C. in an ice bath and 22 g. of ethylene oxide were added in small portions, keeping the temperature below 10° C. After stirring for several hours at room temperature, the mixture was filtered and the filter cake washed with water. The filtrate and wash water were combined and cooled by the addition of 100 g. of ice and the mixture rendered alkaline with 10.8 g. of sodium hydroxide and 53 g. of sodium carbonate.

The p-toluidine diazonium chloride was then prepared by dissolving 23 g. of p-toluidine hydrochloride in 120 cc. of water and cooling the solution to about 3 to 8° C. by the addition of 120 g. of ice. 18.8 g. of concentrated hydrochloric acid were added and the p-toluidine hydrochloride was diazotized by the addition of 11.05 g. of sodium nitrite dissolved in 20 cc. of water. Diazotization was complete after about 20 minutes (as indicated by a starch paper test) yielding a solution containing p-toluidine diazonium chloride.

The p-toluidine diazonium chloride was added to the cooled mono-ethylol cyanamide solution with constant stirring and in small portions. After stirring for several hours, the diazo compound was completely coupled as indicated by a negative test on spotting with 1-naphthol on filter paper. The cream colored precipitate was filtered off. 50 g. of ice and 400 g. of sodium carbonate (soda ash) were added to the filtrate and the mixture stirred for two hours and filtered again. The filter cake which dried to a cream colored powder contained the desired stable product of p-toluidine diazonium chloride and monoethylol cyanamide which was extracted with alcohol and acetone. The diazotized compound in pure form or when mixed with the sodium carbonate precipitate, was stable and did not explode when heated to an elevated temperature.

This diazo compound has the following probable formula:

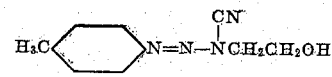

It is readily soluble in denatured ethyl alcohol, cellosolve and acetone. When admixed with any one of a number of coupling components it may be used in printing and dyeing textiles upon acidification. Thus for example, this stabilized diazo product when admixed with sodium α-naphtholate does not couple with the latter even after boiling in an alkaline solution. However, pieces of cotton suspended in this solution are quickly dyed a red color upon acidification with acetic acid and heating the solution.

Example II

*2,3-dihydroxypropyl cyanamide reacted with p-toluidine diazonium hydrochloride*

2,3-dihydroxylpropyl cyanamide was prepared using the procedure described in Example I by adding 37 g. of glycidol dropwise to a slurry consisting of 66.5 g. of cyanamid (60.6% NCNCa) in 250 cc. of water while agitating and maintaining the reaction mixture at a temperature of 10 to 30° C. After standing for several hours, the mixture was filtered and the filter cake washed with water. The filtrate and wash water were combined and cooled by the addition of 100 g. of ice and the mixture rendered alkaline with 20.8 g. of sodium hydroxide and 53 g. of sodium carbonate.

24.7 g. p-toluidine diazonium chloride in solution (as prepared in Example I above) was added in small portions to this dihydroxy cyanamide solution and the mixture stirred for four hours until a test showed that the coupling reaction was practically complete. 100 g. of sodium chloride was added to salt out the reaction product and the mixture was stirred several hours, filtered and the filter cake, dried at room temperature and ground, gave an orange colored powder, stable at room temperature and non-explosive even when heated in a direct flame.

This diazo compound has the following probable formula:

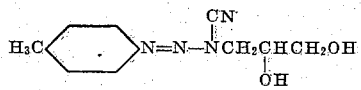

It is readily soluble in water and very soluble in denatured ethyl alcohol, cellosolve, acetone and dioxane.

Any one of a number of coupling components known to those versed in the art can be admixed with this diazo compound, such as 1-naphthol, the o-toluidide of 2,3-hydroxy-naphthoic acid, the 2,5-dimethoxy anilide of 2,3-hydroxy-naphthoic acid, or the 4-chloranilide of 2,3-hydroxy-naphthoic acid. For example, when the stabilized diazo compound was admixed with sodium α-naphtholate in alkaline solution no coupling occurred, but upon acidification coupling took place both at room and at higher temperatures to form a red dye.

Example III

*Tripropoxypropylol cyanamide reacted with p-toluidine diazonium hydrochloride*

Tripropoxypropylol cyanamide was prepared by reacting 232 g. of propylene oxide with a slurry consisting of 134 g. of cyanamid (60.6% NCNCa) in 250 cc. of water at a temperature of 110° C. over a period of 80 minutes in a pressure autoclave. The reacted slurry was cooled to room temperature, filtered and washed with small portions of water. Carbon dioxide was passed into the combined filtrate and washings to precipitate the residual calcium as carbonate. The mixture was filtered and the filtrate evaporated under reduced pressure (10-20 mm.) to yield a pale yellow oily liquid equal to 89.5% of the theoretical yield. 68 g. of this product, tripropoxypropylol cyanamide, were dissolved in 100 cc. of water cooled with ice and the mixture was rendered alkaline with 10.8 g. of sodium hydroxide and 53 g. of sodium carbonate.

This solution, cooled with ice, was stirred and 15.4 g. of p-toluidine diazonium chloride solution was added in accordance with the procedure of the previous examples. Coupling was effected after 15 minutes of stirring. A tarry material formed and was filtered off. After adding 200 g. of sodium carbonate and filtering again, the desired stabilized diazo compound was salted out by the addition of 50 g. of sodium chloride and stirring for several hours. The product was a brown colored oil which floated on the surface and was readily collected by means of a separatory funnel. The product was stable in an aqueous solution even when heated to 80° C.

This diazo compound has the following probable formula:

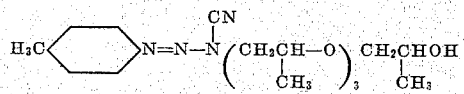

It is soluble in water, denatured ethyl alcohol, acetone, cellosolve and dioxane. When mixed with alkaline sodium α-naphtholate the mixture was stable but coupling took place upon acidification with acetic acid and heating to yield a red dye.

Example IV

Nonaethoxyethylol cyanamide reacted with p-toluidine diazonium hydrochloride Nonaethoxyethyl cyanamide was prepared by reacting 10 mols. of ethylene oxide with 1 mol. of cyanamide slurry by heating in an autoclave under pressure. Thus 134 g. of cyanamid (60.6% NCNCa), 250 cc. of water and 440 g. of ethylene oxide were placed in a pressure autoclave provided with heating and agitating means. During the reaction cycle a gradual rise in pressure took place until a temperature of 92° C. was reached. Then the temperature increased rapidly to a maximum of about 180° C. The reaction mixture was then cooled slowly to room temperature, filtered and the filter cake washed with water. The combined filtrate and washings were treated with carbon dioxide to precipitate the remaining calcium as calcium carbonate which was filtered off. The filtrate was evaporated under reduced pressure (10-20 mm.) to yield an amber colored oily liquid equal to 98% of the theoretical yield. 135 g. of this product, nonaethoxyethylol were dissolved in 100 cc. of water, the mixture rendered alkaline with 10.8 g. of sodium hydroxide and sufficient ice added to cool the solution to 5° C. or lower.

15.4 g. of a diazo compound (p-toluidine diazonium chloride) were added as in previous examples, together with sufficient ice to keep the temperature at 0-5° C. After 30 minutes of stirring, coupling was effected. Any tarry material formed was filtered off, and 200 g. of sodium carbonate were added to the filtrate. The desired diazo compound was salted out of the filtrate by the addition of 90 g. of sodium chloride. The product thus obtained was a brown colored viscous liquid, stable in aqueous solution even when heated to 80° C.

This diazo compound has the following probable formula:

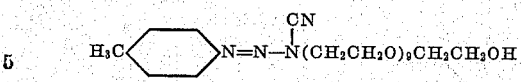

It is soluble in water, denatured ethyl alcohol, acetone, dioxane and cellosolve. When mixed with an aqueous alkaline sodium α-naphtholate solution the mixture was stable but splitting and recoupling took place when acidified with acetic acid and heated to yield a bright red dye.

Example V

Monoethylol guanidine reacted with p-toluidine diazonium hydrochloride

An aqueous solution of monoethylol guanidine was prepared by introducing 23.4 g. of guanidine carbonate into a dilute sulfuric acid solution. The sulfates were precipitated out by the addition of sufficient barium hydroxide and filtered off. The filtrate was cooled to 5° C. with ice and .04 g. of sodium hydroxide dissolved therein. 9.5 g. of ethylene oxide was added slowly with constant stirring and the temperature maintained at 5-10° C. After stirring for 12 hours at 10° C. a solution containing 12.4 g. of monoethylol guanidine was obtained. 30.9 g. of p-toluidine diazonium chloride was then added with stirring to 133 cc. of water containing 12.4 g. of monoethylol guanidine and the solution cooled with ice to 5° C. 14.5 g. of sodium hydroxide dissolved in 25 cc. of water and 44 g. of sodium carbonate were added. A yellow precipitate formed and was filtered off and dried at room temperature to yield a fine brown crystalline powder.

This diazo compound has the following probable formula:

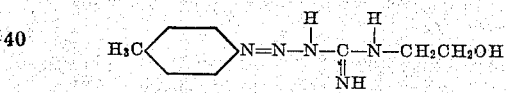

It is almost insoluble in water but readily soluble in acetone, denatured ethyl alcohol and dioxane. When mixed with an alkaline aqueous alcohol solution of sodium α-naphtholate it showed a very high degree of stability and no formation of dyestuff occurred. Coupling took place immediately upon acidification of this mixture with acetic acid while heating to yield a red dye.

Example VI

Diethylol guanidine reacted with p-toluidine diazonium hydrochloride

An aqueous solution of diethylol guanidine was prepared by reacting 46 g. of monoethylol cyanamide prepared as described above and containing 12% water with 84.5 g. of ethylolamine hydrochloride. The reactants were heated over a period of 30 minutes to 130° C. and then at 130 to 140° C. for 10 minutes to yield 91 g. of the diethylol guanidine hydrochloride as a light yellow liquid. Then 11.5 g. of this diethylol guanidine hydrochloride was dissolved in 100 cc. of water cooled with 150 g. of ice. This solution was rendered alkaline by the addition of 5 g. of sodium hydroxide and 26.3 g. of sodium carbonate to yield the desired solution of diethylol guanidine.

7.7 g. of p-toluidine diazonium chloride was added to the above diethylol guanidine solution and the mixture stirred for an hour. A brown somewhat sticky material separated and was filtered off and dried at room temperature to yield a brown soft material.

This diazo compound has the following probable formula:

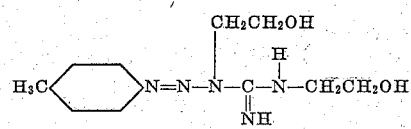

It is sparingly soluble in water but readily soluble in acetone, denatured ethyl alcohol and dioxane. When mixed with an alkaline solution of sodium α-naphtholate it was stable at room temperature but showed some coupling upon heating to 80° C. Coupling takes place readily upon acidification of the mixture with acetic acid and heating as the formation of a definite red azo dyestuff indicates.

EXAMPLE VII

*Ethylol guanylurea reacted with p-toluidine diazonium hydrochloride*

An aqueous solution of ethylol guanylurea was prepared by reacting 33.8 g. of guanylurea sulfate in water and at 28° C. with 11.2 g. of calcium hydroxide slurried in 50 cc. of water. This mixture was constantly stirred for 3 hours at about 10° C. with 8.8 g. of ethylene oxide. It was then reacted for an additional 3 hours while cooled and stirred and then further cooled to 0° C.

23.1 g. of p-toluidine diazonium chloride was added to the above ethylol guanylurea solution with stirring. A brown powder precipitated out and was filtered off and dried at room temperature.

This diazo compound has the following probable formula:

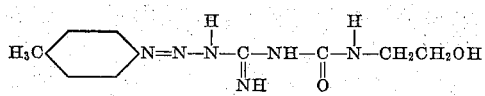

It was almost insoluble in water but soluble in denatured ethyl alcohol and acetone. When mixed with an alkaline solution of sodium α-naphtholate it was stable but the formation of a red azo dyestuff upon addition of acetic acid and heating the mixture showed that coupling was readily effected in an acid medium at an elevated temperature.

EXAMPLE VIII

*Ethylol biguanide reacted with p-toluidine diazonium hydrochloride*

An aqueous solution of biguanide was prepared by reacting 13.25 g. of biguanide sulfate, 8.3 g. of sodium hydroxide and 26.3 g. of sodium carbonate in 100 cc. of water. The solution was cooled with 150 g. of ice and 7.7 g. of p-toluidine diazonium chloride was added to the biguanide solution with constant stirring. A bright yellow precipitate was formed, filtered off and the filter cake dried at room temperature to yield a brown powder. This stabilized diazo compound was slurried in an alkaline aqueous solution, cooled to 5–10° C. with ice and then reacted with 2.7 g. of ethylene oxide introduced slowly and with constant stirring until all of the stabilized diazo compound was in solution.

This solubilized diazo compound has the following probable formula:

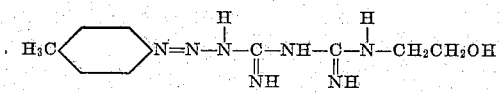

The above prepared solution of the stabilized diazo compound mixed with 2,5-dimethoxy anilide of 2,3-hydroxynaphthoic acid was stable in alkaline solution but quickly formed a red dye upon acidifying and heating the mixture.

EXAMPLE IX

When the relatively insoluble stabilized diazo compound of Example VIII was reacted with glycidol in an aqueous solution to which some sodium hydroxide had been added, a stabilized diazo compound was obtained having the following probable formula:

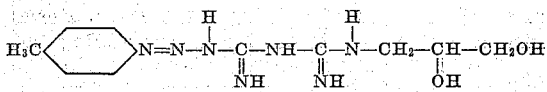

It was soluble in water forming a stable solution. However when mixed with a coupling component free of solubilizing groups, acidified and heated, a water insoluble organic pigment is formed.

Similarly, various other members of the alkylol and alkoxyalkylol series of derivatives of cyanamide, guanidine, guanylurea and biguanide may be obtained by using as a starting material the corresponding compound containing a reactive ethylene oxide ring and a corresponding substituent in the ethylene oxide ring. Thus instead of ethylene oxide, one or more mol. of glycidol, propylene oxide, isopropylene oxide, butylene oxide, isobutylene oxide, etc. etc., can be used in order to render the stabilized diazo compound water soluble. A number of such compounds are described in the copending applications Serial Numbers 289,398 and 289,400 of Water P. Ericks.

It is to be particularly noted that although for ease of description, the aromatic amine chosen in the examples illustrating specific embodiments of the invention was p-toluidine, various other stable diazo compounds can be prepared from practically any ice color diazo component. Thus other typical amines which can be diazotized and reacted with the stabilizing components include in addition to p-toluidine, among numerous others familiar to those versed in the art, aniline as well as homologues of aniline, namely 2,4-dimethylaniline. Where still other color variations are desired, the halogen derivatives of aniline may be used, such as the monochloroanilines, dichloranilines; anilines substituted by hydrocarbon radicals, such as alkyl, alkoxy radicals, for example methyl, ethyl, etc., methoxy, ethoxy, or the like; or anilines substituted by nitro radicals, acyl derivatives thereof, and the like.

Similarly, although 1-naphthol is given as the most frequently used coupling component for the dye mixture incorporating the specific stabilized diazo compounds, various other naphthols, such as naphthol AS, toluidides, pyrazolones, coupling arylides, particularly arylides of 2,3-hydroxynaphthoic acid, other hydroxy or amino-naphthoic acids, carbazole-carboxylic acid, hydroxyanthracene carboxylic acid, anthraquinone carboxylic acid, the anilide of 2,3-hydroxy-naphthoic acid, or the like, may be used as coupling components.

It is to be understood that the examples herein given are merely illustrative and not limitative embodiments of this invention which is to be construed broadly and limited solely as defined by the scope of the appended claims.

We claim:

1. A method of preparing stabilized diazo compounds which comprises condensing an ice color diazo component of the benzene series with a compound selected from the group consisting of cyanamide, dicyandiamide, guanidine, guanylurea, and biguanide, the members of said group being substituted at least once by a member of the group consisting of an alkylol and an alkoxyalkylol but being otherwise unsubstituted.

2. A stabilized diazo compound having the general formula $$R-N=N-R_1$$

in which R is the nucleus of an aromatic amine of the benzene series capable of producing azo dyestuffs and $R_1$ is a radical of a compound selected from the group consisting of cyanamide, dicyandiamide, guanidine, guanylurea, and biguanide, the members of said group being substituted at least once by a member of the group consisting of an alkylol and an alkoxyalkylol group but being otherwise unsubstituted.

3. A stabilized diazo compound having the general formula:

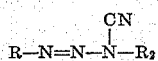

in which R is the nucleus of an ice color diazo component of the benzene series and $R_2$ is selected from the group consisting of an alkylol and an alkoxyalkylol group.

4. A stabilized diazo compound having the formula:

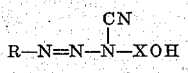

in which R is the nucleus of an ice color diazo component of the benzene series and X is a saturated aliphatic radical containing at least two carbon atoms.

5. A stabilized diazo compound having the formula:

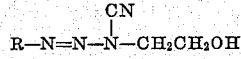

in which R is the nucleus of an ice color diazo component of the benzene series.

6. A stabilized diazo component having the formula:

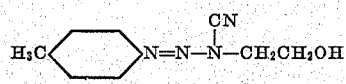

7. A stabilized diazo component having the formula:

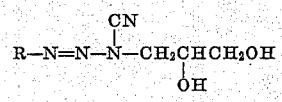

in which R is the nucleus of an ice color diazo component of the benzene series.

8. A stabilized diazo component having the formula:

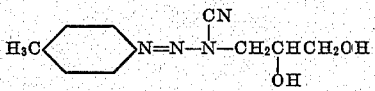

9. A stabilized diazo component having the formula:

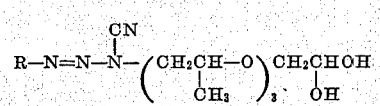

in which R is the nucleus of an ice color diazo component of the benzene series.

10. A stabilized diazo component having the formula:

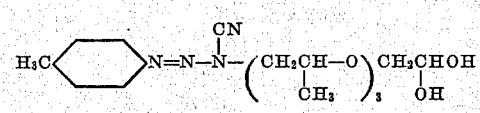

PAUL P. McCLELLAN.
WALTER P. ERICKS.